INVENTOR.
Earle W. Hawkinson
BY
Merchant & Merchant
ATTORNEYS

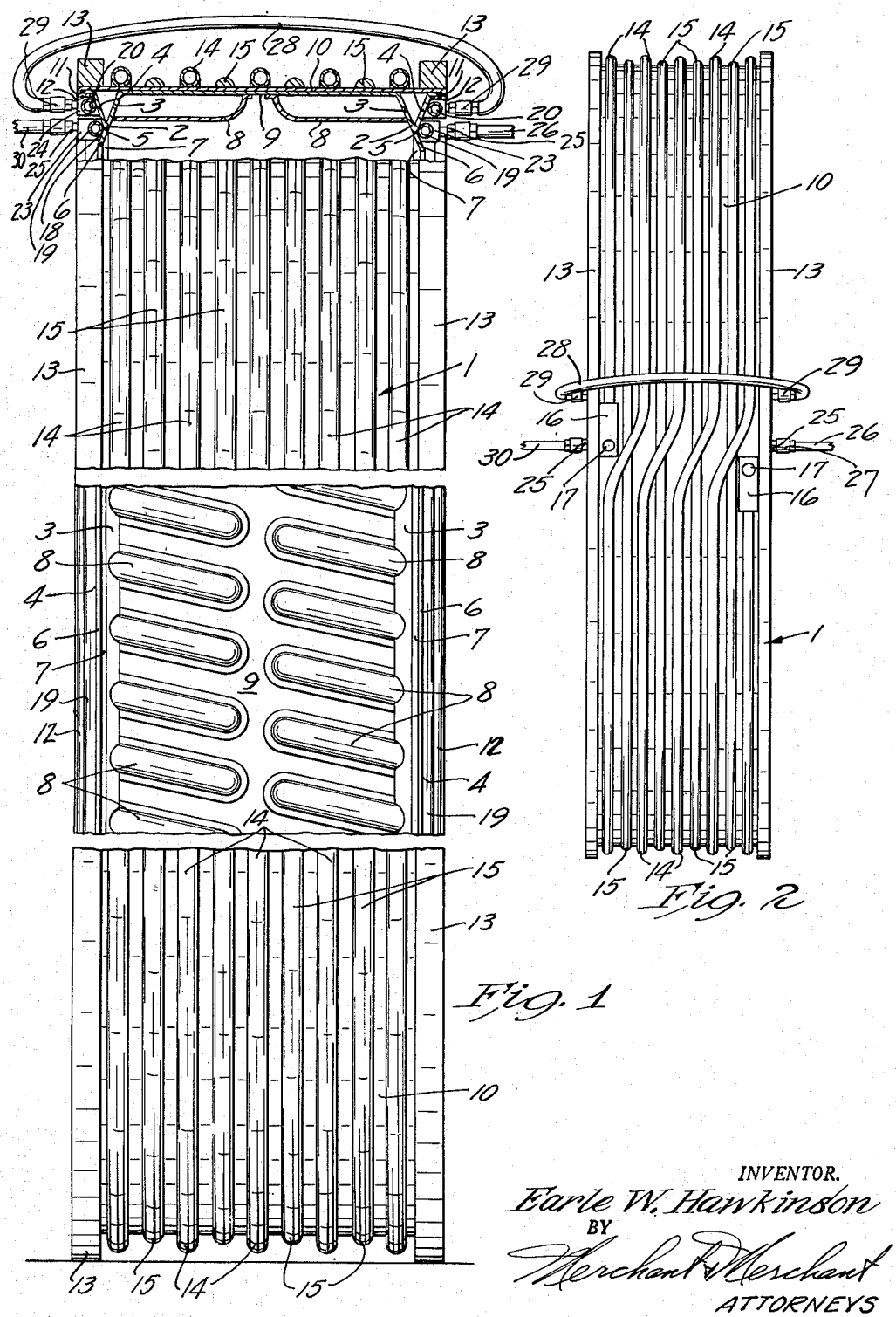

Patented Nov. 24, 1953

2,659,933

UNITED STATES PATENT OFFICE 2,659,933

RETREAD MOLD CONSTRUCTION

Earle W. Hawkinson, Minneapolis, Minn., assignor to Paul E. Hawkinson Company, Minneapolis, Minn., a corporation of Minnesota Application December 24, 1952, Serial No. 327,809

2 Claims. (Cl. 18—18)

My invention relates to improvements in pneumatic tire retreading apparatus, and more particularly to improvements in tire retreading matrices of the type disclosed and claimed in Patents 1,917,262 and 2,331,680, and known commercially as "Hawkinson" treading equipment.

Still more specifically, my invention relates to improvements in "Hawkinson" sheet metal molds or matrices for applying new tread to earth mover or large size truck tires. In such matrices, the primary steam heating coil is essentially confined to the outer peripheral surface of the annular sheet metal matrix. As a consequence, too frequently insufficient heat is brought to bear upon the thick sides of the tread, particularly where it feathers off in contact with the side buffed edge of the worn tread.

The primary object of my invention is the provision of a mold of the class above described which is provided with means for applying heat to the confining flanges of the matrix independently of the primary source of the heat secured to the outer peripheral surface thereof.

A still further object of my invention is the provision of a mold of the type immediately above described in which the confining flanges have adhered thereto independent tubular heating elements which terminate on opposite sides of the mold in inlet and outlet terminals which may be quickly connected to and disconnected from a source of steam or other fluid heating medium.

A still further object of my invention is the provision of a novel means for connecting the two independent heating elements, on opposite confining flanges, in series.

A still further object of my invention is the provision of novel means whereby vulcanizing temperatures may be readily applied to the confining flanges—or alternatively, in which a cooling fluid may be circulated through the tubular conduit associated with each of the confining flanges so as to prevent overheating of the sides of the tread from the primary heating source—should this be necessary or desirable.

The above and still further objects of my invention will become apparent from the following detailed specification, appended claims and attached drawings.

Referring to the drawings, wherein like characters indicate like parts throughout the several views:

Fig. 1 is a view partly in front elevation and partly in vertical axial section, some parts being broken away;

Fig. 2 is a view in top plan, on a reduced scale; and

Figure 3:
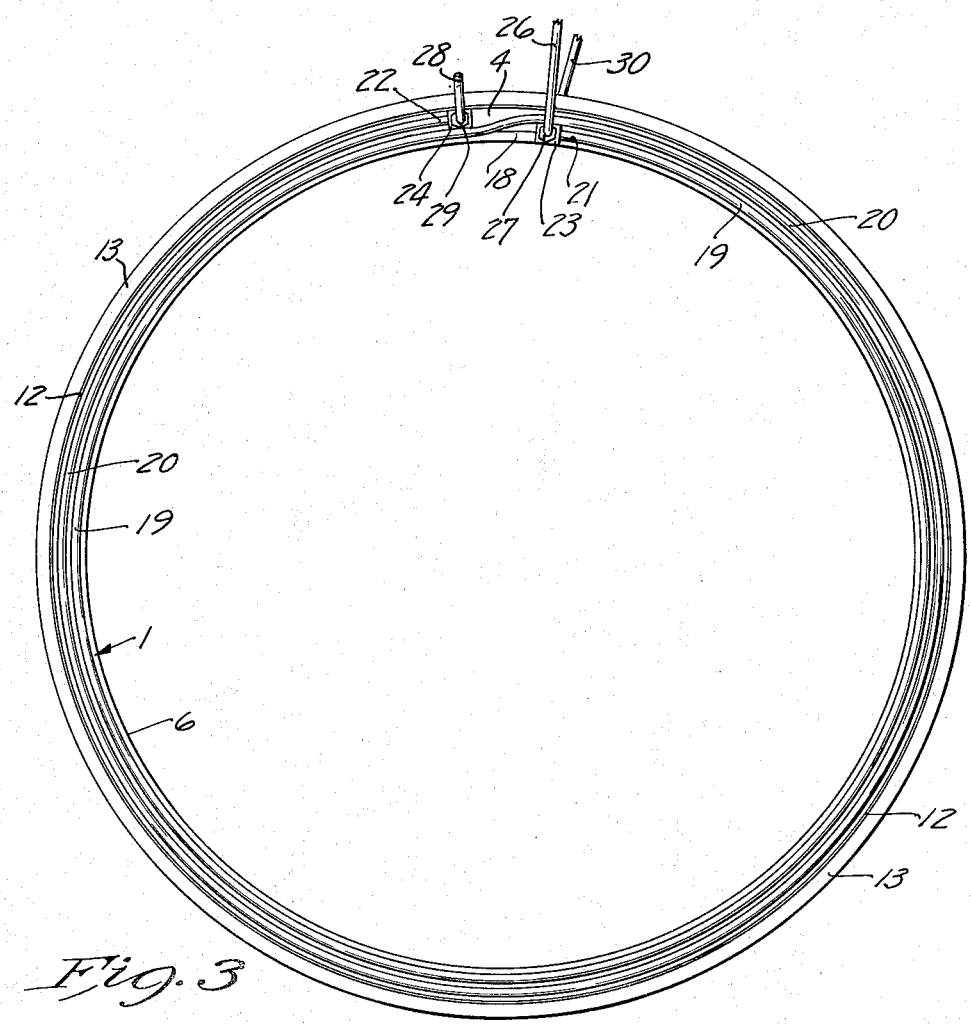
Fig. 3 is a view in side elevation on the same scale as Fig. 2.

Referring with greater particularity to the drawings, the numeral 1 indicates in its entirety a cylinder like matrix formed from sheet metal and having its opposite side edges formed to provide radially inwardly projecting endless V-shaped confining flanges 2. The radially inwardly diverging inner walls of the V-shaped confining flanges 2 are identified by the numeral 3, whereas the radially inwardly converging outer walls thereof are identified by the numeral 4. To effectively extend the confining flanges 2 beyond the point where they would normally be weakened by the depth of the V formed thereby, I secure by welding or the like, as indicated by the numeral 5, cross-sectionally rectangular metallic rings 6. It will be noted that rings 6 have their inner surfaces 7 lying in the same plane as the inner walls 3 of the V-shaped confining flanges 2 so as to form generally radially inward extensions of the walls 3. Suitable tread design forming cups 8 are secured to the interior surface 9 of the matrix 1 by any suitable means such as welding, screws or the like.

As shown, the matrix 1 has an endless reinforcing jacket 10 tightly secured thereabout with the opposite side edges thereof crimped over the lip-like opposite side edge portions 11 thereof, as indicated at 12. This structure and the method of forming same is more fully explained in Patents 2,331,679 and 2,339,696. Immediately overlying the crimped portions 12 and projecting radially outwardly from the outer surface of the reinforcing jacket 10 are endless circumferential rails 13 which facilitate rotation of the matrix 1 without causing damage to the spirally wound primary heating coil 14 secured to the outer peripheral surface of the jacket 10, such as by solder or the like. Also preferably and as shown, a plurality of reinforcing bands 15 tightly encompass the outer peripheral surface of the jacket 10 inbetween each convolution of the heating coil 14. The opposite end portions of the heating coil 14 terminate in enlarged inlet and outlet heads 16 having laterally outward projecting openings 17 therein.

It will be noted that the radially inwardly diverging extension rings 6 and the inwardly converging walls 4 of the V-shaped confining flanges 2 form cross-sectionally V-shaped annular nests 18. Received within the nests 18 is substantially one convolution of tubular heating elements 19 which, preferably and as shown, have a radially outer convolution 20 secured to the surface 4 of the confining flanges 2. The inner and outer ends 21 and 22, respectively, of the tubular conduits 19—20 terminate in enlarged heads 23 and 24, respectively, axially outwardly from which project suitable connector plugs 25, preferably of the type commercially known as "Foster" plugs. Either of the connector plugs 25 may be used for connection to a steam pipe 26 having secured to its free end a cooperating connector element 27, preferably of the type known as the "Foster" socket. In order to connect the two conduits 19 and 20 in series, I provide a flexible conduit 28 which is provided with suitable couplers 29 at its opposite ends such as the "Foster" sockets. As shown, the conduit 28 overlies the radially outer surface of the jacket 10. Preferably and as shown, steam is conducted away from the matrix 1 by means of a lead-off 30 connected to the oppostie head 23 from which the inlet pipe 26 is connected. The lead-off pipe 30 is also preferably provided with a quick acting connector such as a "Foster" plug.

With the above arrangement a number of novel results are achievable. For instance, under circumstances where it is felt that insufficient heat is being transferred from the primary heating coil 14 to the radially inwardly projected ends of the V-shaped confining flanges 2 and the extensions 6, an independent source of heat, through conduit 26, may be snapped on to the connector 25 projecting outwardly from one of the opposed heads 23, the flexible conduits 28 snapped on to the opposed connectors 25 associated with the opposed heads 24, and the lead-off pipe 30 snapped on to the connector 25 associated with the opposite head 23. Under some conditions it may be further desirable to allow heat to run through the coils 19—21 for the same period of time that heat is circulated through primary coil 14. On the other hand, the desired curing period on the sides of the tread may be considerbly less than that required by the primary heating coil 14. It may even be that it is further desirable to run cooling fluid through the pipes 26, 28, and 30 so as to prevent overcuring of the side portions of the tread after a predetermined time. This, of course, may be readily done by substituting cold water for the steam in said conduits.

While I have shown a commercial embodiment of my invention, it should be obvious that same is capable of modification without departure from the scope of the invention as defined by the appended claims.

What I claim is:

1. A tire retreading device comprising an integral cylinder-like matrix formed from sheet metal and having radially inwardly projecting endless tread material confining flanges adjacent its opposite side edges, a tubular heating element coiled about the outer peripheral surface of said matrix and terminating in inlet and outlet heads adjacent opposite side edges, a circular tubular heating element wound about and adhered to the axially outer side of each of said confining flanges, each of said last mentioned heating elements terminating in laterally outwardly projecting fittings, and a flexible conduit spanning the radially outer surface of said matrix and provided at its opposite ends with couplers each adapted to be detachably secured to one of the fittings associated with each of said last-mentioned heating elements.

2. The structure defined in claim 1 in further combination with radially outwardly projecting endless rail elements secured to the outer surface of the matrix one each adjacent an opposite side edge thereof, said rail elements having greater radial heights than the first-mentioned tubular heating element, and in which said confining flanges are formed from sheet metal bent in generally cross-sectionally V-shape and are provided with extension elements comprising endless metallic rings welded to the crown of the V and extending radially inwardly in alignment with their respective axially inner walls of said V-shaped confining flanges, the axially outer walls of said V-shaped confining flanges and the extension elements forming an annular nest for the reception of said circular heating elements.

EARLE W. HAWKINSON.

References Cited in the file of this patent

UNITED STATES PATENTS

| Number | Name | Date |
| --- | --- | --- |
| 2,651,078 | Hawkinson | Sept. 8, 1953 |

FOREIGN PATENTS

| Number | Country | Date |
| --- | --- | --- |
| 13,406/23 | Australia | July 14, 1924 |